July 11, 1944.  E. R. KOPPEL  2,353,477
HOT WATER TANK CONNECTION
Filed June 24, 1943
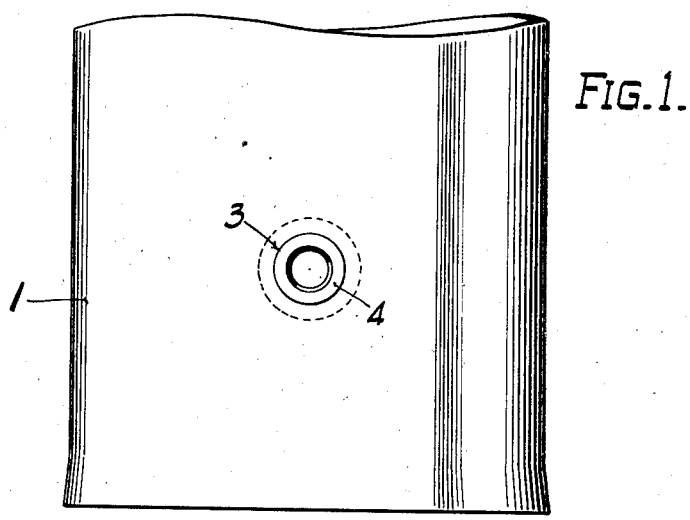
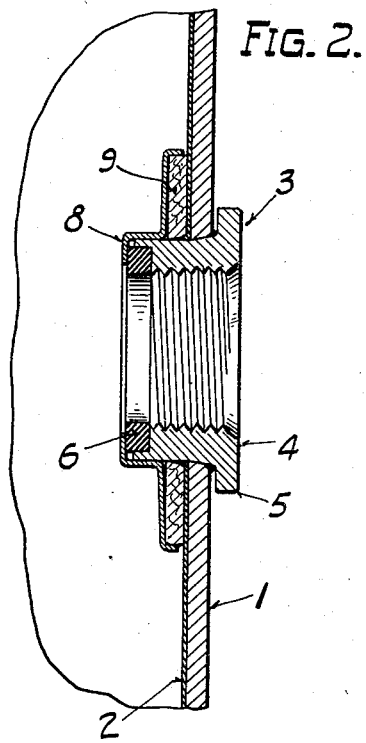
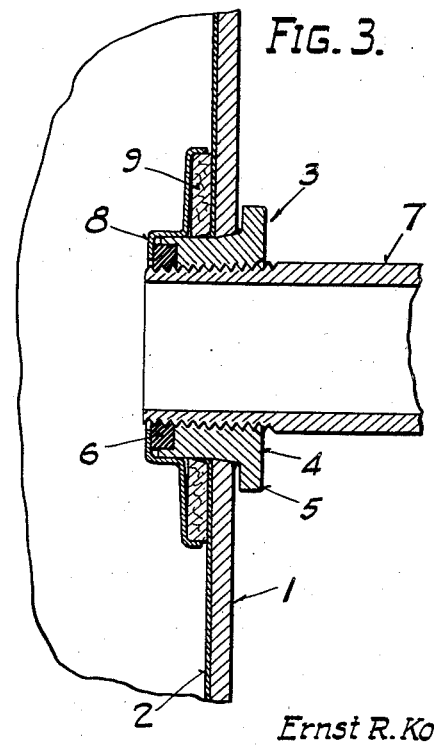
Ernst R. Koppel
INVENTOR.
BY *Irwin C. Andrus*
ATTORNEY.

Patented July 11, 1944

2,353,477

UNITED STATES PATENT OFFICE 2,353,477

HOT-WATER TANK CONNECTION

Ernst R. Koppel, Milwaukee, Wis., assignor to A. O. Smith Corporation, Milwaukee, Wis., a corporation of New York Application June 24, 1943, Serial No. 492,035

4 Claims. (Cl. 285—49)

This invention relates to a hot water tank connection for use with tanks that are lined with material such as ceramic enamel to protect the same from corrosion.

Heretofore, such connections have been constructed of stainless steel or similar non-corrosive materials which permitted exposure to the contents of the tank without possible corrosion. A typical construction is that set forth in U. S. Patent No. 2,266,611 granted December 16, 1941, to Wesley G. Martin and John H. Crider.

The object of the present invention is to eliminate the necessity of employing expensive alloy steel for the body of the connection and to provide a simple means for protecting the body against corrosion.

In carrying out the invention the body of the connection is constructed of any suitable metal, such as plain carbon steel, and a thin washer of corrosion resistant material, such as stainless steel, is secured over the inner end of the body and has its outer edge sealed against the lining of the tank and its inner edge sealed against the threads of the pipe or nipple connected to the tank.

An embodiment of the invention is illustrated in the accompanying drawing in which:

Figure 1 is a side elevation of a tank with parts broken away and showing the connection;

Fig. 2 is an enlarged axial section through the connection and adjacent tank wall; and Fig. 3 is a view similar to Fig. 2 showing a pipe threaded into the connection.

The tank has a wall 1 with a ceramic enamel lining 2 and a plurality of pipe connections 3.

The pipe connections 3 comprise a flanged fitting 4 of ordinary carbon steel having a tapered body electric resistance welded to an opening in the tank wall, the flange 5 being on the outer end of the fitting to provide a positive means to insure proper relative position between the outer surface of the shell and said pipe connection. At the same time this flange 5 provides sufficient surface to allow for the necessary contact area required for resistance welding.

The inner end of the fitting has a recess in which a ring 6 of suitable non-corrosive material, such as neoprene rubber, is disposed. The ring 6 is of such proportions that its outer diameter fits into a recess in the pipe connection 3 as shown on Figures 2 and 3, or as a modification, fits directly into the cup-shaped portion of plate 8 and flush against the end of pipe connection 3. The inner diameter of ring 6, if made from compressible material is substantially similar to that of the pitch diameter of the threads of said fitting 3 to provide for threading of the pipe or nipple 7 into it. In place of a packing type of ring, it is possible to construct the ring of stainless steel or alloy and to thread it corresponding to the threads of the fitting so that the pipe screws into it, in which case the inner diameter of ring 6 corresponds substantially to the inner diameter of fitting 4.

The ring 6 is held in place by a thin cover plate 8 of stainless steel or other non-corrosive material which is preferably cup-shaped to fit tightly over the inner end of the fitting 4. The plate 8 may be dimensioned relative to the fitting 4 so that the tightness of fit between the two is sufficient to hold the plate, or it may be welded or otherwise secured in place.

The outer edge of cover plate 8 locates an asbestos or glass washer 9 tightly against lining 2 of the tank similar to the washer 10 of the patent above referred to. The outer edge of plate 8 is turned over to confine washer 9 and the thickness of washer 9 is such that the outer edge of plate 8 cannot come in contact with lining 2 of the tank.

In constructing the tank the threaded fitting 4 is welded to the tank prior to the application of the lining 2 thereto. After the lining 2 is applied and fused, the ring 6 and washer 9 are applied and the plate 8 pressed or welded onto the end of the fitting to secure parts 6 and 9 in place.

In subsequently threading the pipe, nipple or similar connection 7 into fitting 3, ring 6, in case packing material is used, will be compressed between the threads in member 7, forming a substantially threaded connection between the nipple 7 and ring 6, and at the same time compressing ring 6 so as to form a tight seal against plate 8 and the end of fitting 3. In this manner circulation of the contents of the tank to the corrosive fitting 4 is prevented. In case ring 6 is made from non-corrosive metal, as mentioned above, metal-to-metal contact between member 7 and ring 6 is relied upon to seal the parts.

The seal obtained need not be leakproof, but it should be sufficient to prevent free circulation of corrosive liquid to the fitting and tank wall.

The invention may have various embodiments within the scope of the accompanying claims.

I claim:

1. A tank connection for domestic water heaters and the like, comprising an internally threaded fitting of corrodible material secured in the wall of a tank which is lined to protect the same from corrosion, a protective non-corrosive plate secured over the inner end of said fitting and having a central opening registering with the opening of said fitting, means sealing the outer edge of said plate to the lining of the tank, and a ring of non-corrodible material sealing the inner edge of said plate against the end of a member threaded into said fitting to thereby protect the fitting from corrosion.

2. A tank connection for domestic water heaters and the like, comprising an internally threaded fitting of corrodible material secured in the wall of a tank which is lined to protect the same from corrosion, a protective plate secured over the inner end of said fitting and having a central opening registering with the opening of said fitting, means sealing the outer edge of said plate to the lining of the tank, and a ring of non-corrodible packing material secured at the inside of the inner end of the fitting for sealing the plate against the end of a member threaded into said fitting.

3. A tank connection for domestic water heaters and the like, comprising an internally threaded fitting of corrodible material secured in the wall of a tank which is lined to protect the same from corrosion, a protective plate secured over the inner end of said fitting and having a central opening registering with the opening of said fitting, means sealing the outer edge of said plate to the lining of the tank, and a ring of non-corrodible packing material secured at the inside of the inner end of the fitting for sealing the plate against the end of a member threaded into said fitting, said packing ring having a diameter similar to that of the pitch diameter of the threads of said fitting and being adapted to receive the threaded end of the member to compress it against the fitting, the plate and the threaded member.

4. A tank connection for domestic water heaters and the like, comprising an internally threaded fitting of corrodible material secured in the wall of a tank which is lined to protect the same from corrosion, a protective plate secured over the inner end of said fitting and having a central opening registering with the opening of said fitting, means sealing the outer edge of said plate to the lining of the tank, and a non-corrodible metal ring secured to said plate at the inside of the inner end of the fitting and having internal threads corresponding to those of said fitting to receive the inner end of a member threaded into the same and seal the same to prevent corrosion of the fitting.

ERNST R. KOPPEL.